(12) United States Patent
De' Longhi et al.

(10) Patent No.: US 11,464,361 B2
(45) Date of Patent: Oct. 11, 2022

(54) AUTONOMOUS APPARATUS FOR COOKING FOOD AND CORRESPONDING METHOD

(71) Applicant: De' Longhi Appliances S.r.l. con Unico Socio, Treviso (IT)

(72) Inventors: Giuseppe De' Longhi, Treviso (IT); Renzo Mazzon, Silea (IT)

(73) Assignee: De'Longhi Appliances S.R.L. Con Unico Socio, Treviso (IT)

( * ) Notice: Subject to any disclaimer, the term of this patent is extended or adjusted under 35 U.S.C. 154(b) by 772 days.

(21) Appl. No.: 16/339,204

(22) PCT Filed: Oct. 3, 2017

(86) PCT No.: PCT/EP2017/075091
§ 371 (c)(1),
(2) Date: Apr. 3, 2019

(87) PCT Pub. No.: WO2018/065424
PCT Pub. Date: Apr. 12, 2018

(65) Prior Publication Data
US 2019/0307291 A1    Oct. 10, 2019

(30) Foreign Application Priority Data
Oct. 4, 2016 (IT) .................... 102016000099527

(51) Int. Cl.
*A47J 37/06* (2006.01)
(52) U.S. Cl.
CPC ................................. *A47J 37/0641* (2013.01)

(58) Field of Classification Search
CPC .... A47J 37/0641; A47J 27/002; A47J 27/004; A47J 37/047; A47J 36/32; A47J 37/1257; A47J 36/165; A47J 37/1266; A47J 37/1271; A47J 37/0629; A47J 37/10
USPC ......... 99/326, 330, 331, 348, 357, 445, 447, 99/476; 219/386, 387, 392, 400, 413
See application file for complete search history.

(56) References Cited

U.S. PATENT DOCUMENTS

| | | | |
|---|---|---|---|
| 2014/0305927 A1* | 10/2014 | Alexander | A47J 41/0044 219/387 |
| 2015/0201806 A1* | 7/2015 | Yoshidome | A47J 37/10 99/447 |
| 2016/0081509 A1 | 3/2016 | Delrue et al. | |

FOREIGN PATENT DOCUMENTS

| WO | 2016041912 A1 | 3/2016 |
|---|---|---|
| WO | 2017017356 A1 | 2/2017 |

OTHER PUBLICATIONS

Int'l Search Report and Written Opinion dated Jan. 18, 2018 in Int'l Application No. PCT/EP2017/075091.

\* cited by examiner

*Primary Examiner* — Phuong T Nguyen
(74) *Attorney, Agent, or Firm* — Panitch Schwarze Belisario & Nadel LLP

(57) ABSTRACT

Autonomous apparatus for cooking food including a support body (12), a lid (14), a container (16) open at the top and able to be extracted/inserted with respect to said support body (12), and at least a main heating device (18).

5 Claims, 1 Drawing Sheet

AUTONOMOUS APPARATUS FOR COOKING FOOD AND CORRESPONDING METHOD

CROSS-REFERENCE TO RELATED APPLICATIONS

This application is a Section 371 of International Application No. PCT/EP2017/075091, filed Oct. 3, 2017, which was published in the English language on Apr. 12, 2018, under International Publication No. WO 2018/065424 A1, which claims priority under 35 U.S.C. § 119(b) to Italian Application No. 102016000099527, filed Oct. 4, 2016, the disclosures of each of which are incorporated herein by reference.

FIELD OF THE INVENTION

The present invention concerns an autonomous apparatus for cooking food, comprising a support body, a lid and a container for the food that can be removed/inserted with respect to the support body.

The autonomous apparatus also comprises at least one heating device and a possible element able to generate a stream of air to the food.

BACKGROUND OF THE INVENTION

In the domestic environment, autonomous apparatuses for cooking food are known, comprising a support body and a selectively removable internal container, open at the top.

The autonomous apparatus is also provided with a lid, possibly part of or associable with the support body, which can be closed on the internal container to create a cooking compartment having a controlled atmosphere suitable for the cooking to be carried out.

The controlled atmosphere is generated by a heating device, or an element that produces heat energy, normally located under the container.

For manufacturers of cooking apparatuses of this type, there is often a need to produce products able to expand the range of recipes that can be prepared, therefore not limited to the typical use of frying with a limited quantity of fat, sautéing and heat operations, but also allowing typically oven cooking, such as roasts, au gratin, or suchlike.

Consequently, for making pizzas, pies/cakes, or suchlike, it is necessary to cook at a high temperature under a direct heat action and in a dry atmosphere, in order to obtain the surface coloring of the food.

To obtain this result, known cooking apparatuses can be provided with an additional heating device located above the container.

The latter is, for example, located in the lid, and is normally associated with an aperture that concentrates the distribution of the stream of air in a limited zone, differentiating the heat distribution, and hence cooking, at different points in the cooking compartment.

Consequently, a heating device configured as described above does not allow to have a homogeneously distributed temperature inside the cooking compartment in order to obtain a food with a soft consistency inside and crisp outside, typical of a baked product.

Autonomous apparatuses for cooking food are also known that provide systems to distribute the heat flow inside the food cooking container. However, these systems generally use solutions that prevent the user from seeing inside the cooking apparatus when the lid is closed.

It is also known that known autonomous apparatuses are generally provided with a rotating mixing apparatus to allow the heat to affect, throughout its cooking, the whole surface of the food if its consistency allows mixing.

Document WO-A-2017/017356 describes an apparatus for cooking food, equipped with a mixing blade mobile with respect to a container, in which at least one ingredient is put in at least two distinct cooking zones of the container, of which one is directly below the heating flow. This document then provides a cooking process in which it varies both the temperature delivered and the fan speed in relation to the relative movement between the blade and the container.

Document US-A-2016/0081509 also describes a cooking apparatus comprising a food container and a mixing blade, equipped with reciprocal relative motion, in which upper heating means are provided.

The solution described in this document necessarily requires the combination of mixing blade and container in order to be able to operate. Furthermore, the combination of the shaft and the hub of the mixing blade prevents complete use of the cooking surface of the container. Moreover, this document does not provide the use of a lower heating mean.

Document WO-A-2016/041912 describes a cooking apparatus that has a rack with a holed bottom, which prevents the cooking of food with minimal fluidity. In this solution, moreover, the cooking flow is not conveyed directly onto the food inside the container but follows a circuit between the outside of the rack and the permeable bottom of the container, which reduces the heating efficiency.

In all these solutions, if the recipe does not provide mixing, for example, for cooking pizzas or pies/cakes, it is difficult to make the heat distribution on the food uniform, or to expose the food uniformly to a heat source.

None of these apparatuses, therefore, is suitable for cooking solid food, such as pizzas, pies/cakes or roasts, which do not require the use of mixing means.

Documents U.S. Pat. Nos. 8,707,862 B and 4,173,925 describe rotating and oscillating pots for cooking food through heat conduction.

These pots do not provide to generate a heated stream of air and therefore do not allow the food to be uniformly exposed to a heat source.

One purpose of the present invention is to obtain an autonomous apparatus for cooking food which allows to distribute the heat homogeneously inside a cooking compartment.

Another purpose of the present invention is to obtain an autonomous apparatus for cooking food that makes the heat exchange uniform.

Another purpose of the present invention is to obtain an autonomous apparatus for cooking food which allows to distribute the heat homogeneously and at the same time allows good visibility inside the apparatus even with a possibly closed lid.

Another purpose of the present invention is to obtain an autonomous apparatus that allows optimum cooking of food that do not require any mixing, such as pizzas, pies/cakes, roasts or suchlike.

Another purpose of the present invention is to obtain an autonomous apparatus that allows a correct cooking of the food, and allows to make various types of cooking and with different types of food.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns an autonomous apparatus for cooking food comprising a support body, a lid, a container open at the top and able to be extracted/inserted with respect to the support body, and at least a main heating device located above the container and associated with an aperture for sending a localized air stream inside the container.

The autonomous apparatus for cooking food does not have a mixing mean associated with the container.

According to one aspect of the present invention, the apparatus comprises a control and command unit connected to a drive member associated with the container to determine a selective rotation of the container around its axis of rotation, said control and command unit also being associated with the main heating device, the activation and rotation modes of the container being functionally correlated at least to the power supplied by the main heating device.

By functionally correlated we mean that the control and command unit are memorized functions that determine a relation between the movement of the container, in terms of speed and rotation cycles, to the selective activation of the heating device.

For example, these functions can provide that the heating device is activated at a first lower temperature level with the container stationary, and is then activated at a second higher temperature level when the container is made to rotate, so that the higher temperature of the heating device is reached with the container rotating, for a better distribution of the heat in the food present in the container.

This better distribution of the heat is also facilitated on the one hand by the fact that the absence of a mixing device does not create an obstacle to the correct flow of the hot stream when the container is rotating, and on the other hand by the fact that the container, closed at the bottom part, does not allow the hot stream to disperse outside the container itself.

Then, when the container is stopped, the heating device can be returned once again to its lower temperature level, in order to obtain a final heating of the food at a moderate temperature.

Advantageously, according to a variant and the recipe to be prepared, a user can set the cooking apparatus with parameters, such as the temperature to be obtained inside the cooking compartment, the rotation speed of the container, the rotation modes of the container, for example continuous or discontinuous, the frequency of the rotation cycles, or more.

According to one aspect of the invention, the autonomous apparatus also provides an air stream generator element connected to the control and command unit.

In this way, the activation and/or delivery speed of the air stream generator element can be coordinated with the rotation of the container in order to maximize the uniform transfer of the heat toward the food.

For example, in one embodiment, the control and command unit can provide functions that determine the activation of the air stream generator element at a higher level of delivery when the container is made to rotate, while a lower level of delivery, or even stoppage, is maintained when the container is stopped.

More generally, the rotation speed and/or the rotation time and/or the activation of the rotation of the container are coordinated, possibly also in a way that can be modified by the user, with the delivery speed of the air stream to the food present in the container.

According to one aspect of the invention, the autonomous apparatus also provides at least a second heating element, or auxiliary heating element, located, for example, below the container.

In this case, the activation and activation modes of the second heating element can be regulated by the control and command unit, in correlation with the rotation of the container, according to similar or possibly different modes than those described in relation to the first heating element.

For example, depending on the type of cooking and/or the type of food, the second heating element can be activated at a first higher temperature level when the container is stationary, so as to obtain a first cooking at high temperature, and a second lower temperature level when the container is rotating, so as to obtain a uniform heat on the food with longer lasting cycles at a low temperature.

Advantageously, thanks to the rotation of the container and the absence of mixing means, and therefore of mixing steps during the cooking process, the autonomous apparatus allows a homogeneous distribution of the heat, keeping a localized stream of air, and at the same time makes it possible to provide a lid suitably configured to allow a user to see inside the container even with the lid closed.

The present invention also concerns a method for cooking food using the autonomous apparatus described above, which comprises the use of a control and command unit to coordinate the rotation speed and/or the rotation time and/or the activation of the rotation of the container at least with the power delivered by the main heating device and, secondarily, with the delivery speed of the possible air stream generator element, and the power delivered by the possible second heating element.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
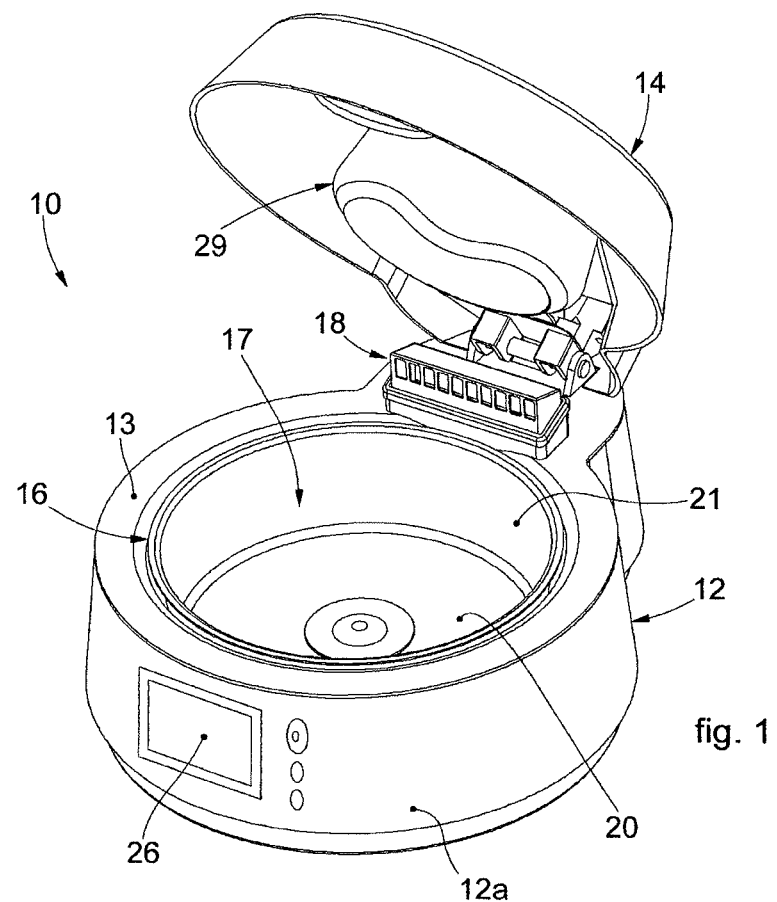
FIG. 1 is a perspective view of an autonomous cooking apparatus.
Figure 2:
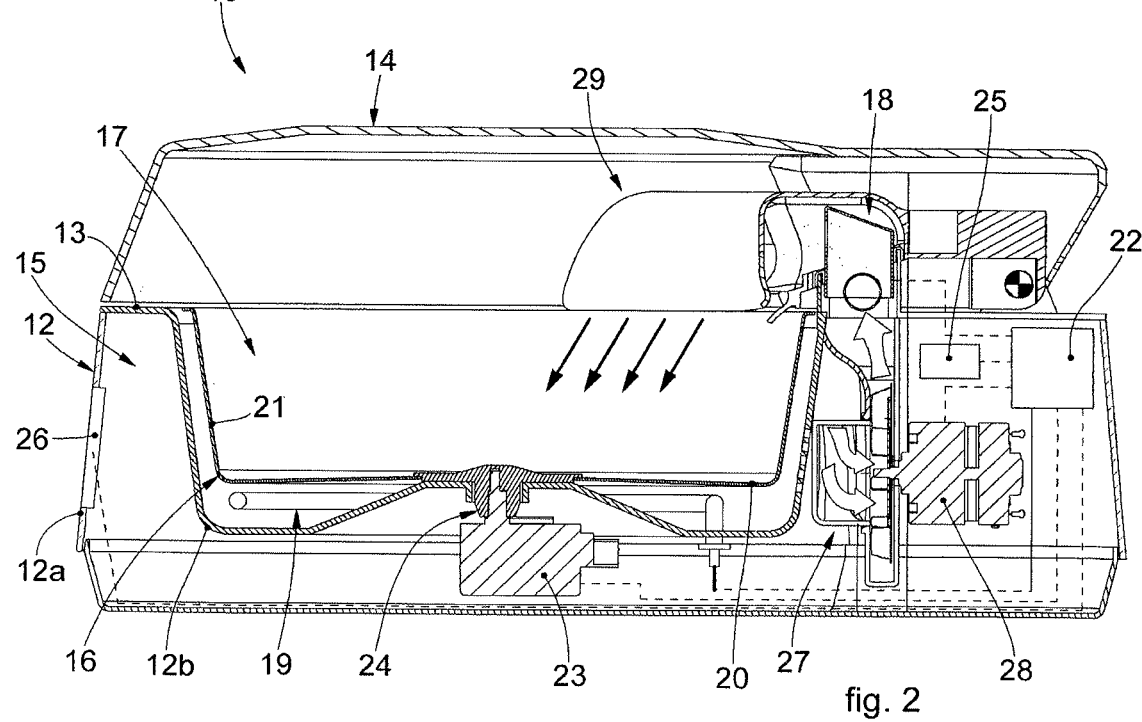
FIG. 2 is a section view of the cooking apparatus in FIG. 1.

Embodiments described here in FIGS. 1 and 2 refer to an autonomous apparatus 10 for cooking food, able to perform different cooking methods, such as boiling, frying, sautéing, browning, and furthermore roasting, au gratin, for making pizzas, pies/cakes, timbales, baked pasta, and similar recipes that require baking in the oven.

The autonomous apparatus 10 comprises a support body 12, with which an openable lid 14 is associated, an internal container 16 removable from/insertable into the support body 12, which is open at the top and defines a cooking compartment 17 for food, and a main heating device 18.

The support body 12 has an external wall 12a and an internal wall 12b, adjacent during use to the container 16. Between the external wall 12a and the internal wall 12b there is a cavity 15 which can act as a technical compartment.

The support body 12 has an upper edge 13 cooperating at least partly with a lower edge of the lid 14 when the latter is closed to cover the container 16.

The main heating device 18 is located above the container 16 and is associated with an aperture 29 for sending a localized stream of air inside the container 16.

For example, the main heating device 18 is positioned in relation to a portion of the upper edge 13 of the container 16 and partly installed inside the cavity 15 so as to protrude with respect to the upper edge 13.

According to one embodiment, the main heating device 18 is configured to heat the stream of air passing through to a temperature from 150° C. to 250° C., in particular from 200° C. to 250° C.

The presence of the lid 14 is functional to create a controlled environment and the conditions necessary for cooking the food.

The lid 14 can be made of the same material as the support body 12, or of a different material.

Advantageously, at least the lid 14 can be made of at least partly transparent material, to allow the user to view and thus control the cooking.

For example, the lid 14 can be made of polymer material or glass.

The container 16 is defined by a base wall 20, which in the present case is substantially circular, and by a lateral wall 21 connected to the base wall 20.

The base wall 20 can have a surface made with a plurality of configurations, for example conical or with a more or less accentuated humped shape.

In a preferred embodiment, to which reference will be made below, the base wall 20 has a substantially flat configuration.

In another embodiment, the container 16 is holed in correspondence with the lateral wall 21.

In correspondence with the base wall 20 the container 16 has a pin 24 facing the opposite side of the cooking compartment 17 and configured to be coupled with a drive member 23.

Furthermore, the pin 24 can be configured to allow for easy removal and positioning of the container 16 inside the support body 12.

According to one embodiment of the present invention, which is shown by way of example in FIGS. 1 and 2, the autonomous apparatus 10 also comprises an additional auxiliary heating device 19 positioned in relation to the base wall 20, that is, below the container 16.

The main heating device 18 and the auxiliary heating device 19 can be made of tubular electric resistances, or resistive bands, or resistive induction wires, able to generate heat and to convey it by induction or irradiation.

The autonomous apparatus 10 comprises a control and command unit 22 configured to cooperate with the drive member 23 associated with the container 16 to determine the rotation of the latter continuously or discontinuously around its axis of rotation.

According to one embodiment, the drive member 23 is configured to impart on the container 16 different levels of rotational speed according to specific cooking functions.

For example, in a possible embodiment, the drive member 23 is configured to determine a first speed level from about 2 rpm to 4 rpm, a second speed level from about 6 rpm to 8 rpm, and a third speed level higher than 50 rpm.

Advantageously, in combination with the container 16 having the holed lateral wall 21, and in relation to particular steps of the cooking cycle or particular recipes, the drive member 23 can impart a high number of revolutions to the container 16, for example equal to the third speed level, in order to obtain a final centrifugal drying effect of the food being cooked, and drain any liquid residues.

The control and command unit 22 is also configured to cooperate with at least the main heating device 18 so as to correlate the power delivered to the rotation speed and/or time and/or the rotation frequency of the container 16.

For example, and without this being a limiting condition, the control and command unit 22 is programmed to heat the stream of air to a lower first level, for example comprised between 150° C. and 200° C., when the container 16 is stationary or rotates at a first lower speed, for example 2-4 rpm, and heat it to a second higher level, for example between 200° C. and 250° C., when the container 16 rotates at a second higher speed, for example 6-8 rpm.

These parameters can be pre-memorized inside the control and command unit 22, or set and/or modified by the user according to the recipe to be prepared and/or the food to be cooked or heated.

The control and control unit 22 can be installed inside the cavity 15 of the support body 12.

The control and command unit 22 is also connected to the auxiliary heating device 19 to coordinate the rotation speed and/or the rotation time and/or activation of the rotation of the container 16 to the power delivered by the auxiliary heating device 19.

In this way, the rotation or stopping of the container 16 is coordinated with the delivery modes of the heating devices 18, 19 so that, for example, the main heating device 18 is activated at a higher level and the auxiliary heating device 19 is activated at a lower level, or switched off, when the container 16 is rotating, and vice versa when the container 16 is stationary.

According to the present invention, the main heating device 18 cooperates with an element 27 to generate an air stream.

The air stream generator element 27 allows to generate the hot stream of air and to send it into the cooking compartment 17.

For example, the air stream generator element 27 can be an axial, centrifugal, or mixed axial/centrifugal fan, made to rotate by a drive member 28.

According to one embodiment, the air stream generator element 27 associated with the drive member 28 generates a stream of air of 3 m/sec to 4 m/sec.

According to another embodiment, the control and control unit 22 can be connected to a sensor element, not shown in the drawings, configured to detect physical parameters inside the cooking compartment, such as temperature, humidity, pressure, or suchlike.

In this way, the control and command unit 22 is able to process instructions to be sent to the devices with which it communicates, in order to regulate the physical parameters inside the cooking compartment 17.

In this case too, the control and command unit 22 can memorize functions that provide to activate the air stream generator element 27 at a higher level when the container 16 is rotating and activate it at a lower level when the container 16 is stationary.

According to one embodiment, the control and command unit 22 can be connected to a memory 25 configured to memorize a plurality of control instructions.

The control instructions, which can possibly be modified by the user, can comprise punctual functioning parameters such as, for example, the power level of the main heating device 18, and possibly also of the auxiliary heating device 19, the speed imparted to the container 16 by the drive member 23, the functioning mode of the drive member 23, whether continuous or discontinuous according to a functioning duty cycle, a functioning interval of the autonomous apparatus 10.

According to one embodiment, the control and command unit 22 can be connected to a user interface device 26 configured to allow a user to choose the desired control instruction, for example based on the type of recipe to be prepared, whether a pizza, or a pie, or suchlike.

According to a variant embodiment, the user interface device 26 can be installed in the autonomous apparatus 10 and, for example, be provided with buttons, knobs, display means, for example monitors, to facilitate the display of possible warning lights.

According to another variant embodiment, the user interface device 26 can be a remote device, for example a smartphone, tablet, remote control or suchlike, which communicates wirelessly with the autonomous apparatus 10 by means of a Wi-Fi protocol, or Infrared communication, IrDa type, or other.

We will now give some examples of the functioning of the autonomous apparatus 10.

In a first step, the container 16 rotates at a speed of about 2 rpm to 4 rpm, while the speed of the stream of air exiting from the sending aperture 29 is 2 m/sec and the temperature at exit from the sending aperture 29 is between 150° C. and 200° C.

In a second step, the container 16 rotates at a speed from about 6 rpm to 8 rpm, while the speed of the stream of air at exit from the sending aperture 29 is about 4 m/sec and the temperature at exit from the sending aperture 29 is between 200° C. and 250° C.

According to one embodiment, if the container 16 has the holed lateral wall 21, the container 16 can be made to rotate, for a time determined by the cooking program, at a speed of more than 50 rpm, at least the first main heating device 18 and the air stream generator 27 being advantageously deactivated, to perform a drying cycle of the food and to drain residual liquids.

It is clear that modifications and/or additions of parts can be made to the autonomous apparatus 10 and corresponding method as described heretofore, without departing from the field and scope of the present invention.

It is also clear that, although the present invention has been described with reference to some specific examples, a person of skill in the art shall certainly be able to achieve many other equivalent forms of autonomous apparatus 10 and corresponding method, having the characteristics as set forth in the claims and hence all coming within the field of protection defined thereby.

The invention claimed is:

1. An autonomous apparatus for cooking food comprising:
   a support body,
   a lid,
   a container open at the top, closed at the bottom and able to be extracted/inserted with respect to said support body,
   an air stream generator element,
   a main heating device located above said container and associated with a sending aperture for sending a localized air stream inside the container,
   an auxiliary heating device disposed below said container,
   a drive member associated with said container,
   a control and command unit (i) connected to the drive member and configured to determine a selective rotation of said container around its axis of rotation, and (ii) associated with the main heating device,
   wherein the activation and rotation modes of the container are functionally correlated at least to the power supplied by the main heating device and by the auxiliary heating device,
   wherein when the container is stationary, the main heating device is activated at a first main temperature level and the auxiliary heating device is activated at a first auxiliary temperature level higher than the first main temperature level, and when the container is rotating the main heating device is activated at a second main temperature level higher than the first main temperature level and the auxiliary heating device is activated at a second auxiliary temperature level lower than the first auxiliary temperature level, and
   wherein said apparatus is bladeless.

2. The autonomous apparatus as in claim 1, wherein said control and command unit is configured to at least one of (i) activate or (ii) regulate, the delivery of the air stream generator element in a manner coordinated with the rotation of the container in order to maximize the uniform transfer of the heat toward the food.

3. The autonomous apparatus as in claim 1, wherein said control and command unit is connected to a sensor element being configured to detect physical parameters inside a cooking compartment.

4. The autonomous apparatus as in claim 1, wherein said control and command unit is connected to a memory configured to memorize a plurality of control instructions.

5. The autonomous apparatus as in claim 1, wherein the container has a holed lateral wall, and the container is configured to rotate when the main heating device is deactivated to perform a drying cycle of the food and to drain residual liquids.

* * * * *